(12) United States Patent
Rooke et al.

(10) Patent No.: US 11,872,569 B2
(45) Date of Patent: Jan. 16, 2024

(54) CENTRIFUGE APPARATUS WITH LAYERED FLYING LEADS

(71) Applicant: Dynamic Extractions Limited, Blaenau Gwent (GB)

(72) Inventors: David Rooke, Blaenau Gwent (GB); Colin Bright, Blaenau Gwent (GB)

(73) Assignee: Dynamic Extractions Limited, Blaenau Gwent (GB)

( * ) Notice: Subject to any disclaimer, the term of this patent is extended or adjusted under 35 U.S.C. 154(b) by 817 days.

(21) Appl. No.: 16/762,350

(22) PCT Filed: Nov. 14, 2018

(86) PCT No.: PCT/GB2018/053303
§ 371 (c)(1),
(2) Date: May 7, 2020

(87) PCT Pub. No.: WO2019/097231
PCT Pub. Date: May 23, 2019

(65) Prior Publication Data
US 2021/0213464 A1     Jul. 15, 2021

(30) Foreign Application Priority Data
Nov. 16, 2017   (GB) ..................... 1718968

(51) Int. Cl.
*B04B 5/04*   (2006.01)
*B32B 1/08*   (2006.01)
*B32B 27/32*  (2006.01)
*G01N 30/42*  (2006.01)
*B04B 5/02*   (2006.01)

(52) U.S. Cl.
CPC .............. *B04B 5/0442* (2013.01); *B04B 5/02* (2013.01); *B32B 1/08* (2013.01); *B32B 27/322* (2013.01); *G01N 30/42* (2013.01); *B04B 2005/0492* (2013.01); *B32B 2307/716* (2013.01); *B32B 2597/00* (2013.01)

(58) Field of Classification Search
CPC . B04B 5/0442; B04B 5/02; B04B 2005/0492; B32B 1/08; B32B 27/322; B32B 2307/716; B32B 2597/00; G01N 30/42
See application file for complete search history.

(56) References Cited

U.S. PATENT DOCUMENTS 4,299,256 A   11/1981   Bacehowski et al.
4,389,206 A    6/1983   Bacehowski et al.
(Continued)

FOREIGN PATENT DOCUMENTS

EP    0619144 A2    10/1994
WO    2013045943 A2   4/2013

*Primary Examiner* — Walter D. Griffin
*Assistant Examiner* — Shuyi S. Liu
(74) *Attorney, Agent, or Firm* — GableGotwals

(57) ABSTRACT

A flying leads assembly includes a flying lead having an inner layer which forms a liquid passage and an outer layer which acts as a sacrificial layer in use, thereby allowing integrity of the passage to be maintained for a long period of time. A further layer is provided intermediate the inner and outer layers which can be used to provide support to the assembly. The flying lead assembly, or a number of assemblies, are then located in a guide with lubricant material.

10 Claims, 4 Drawing Sheets

(56) References Cited

U.S. PATENT DOCUMENTS

Figure 1A:
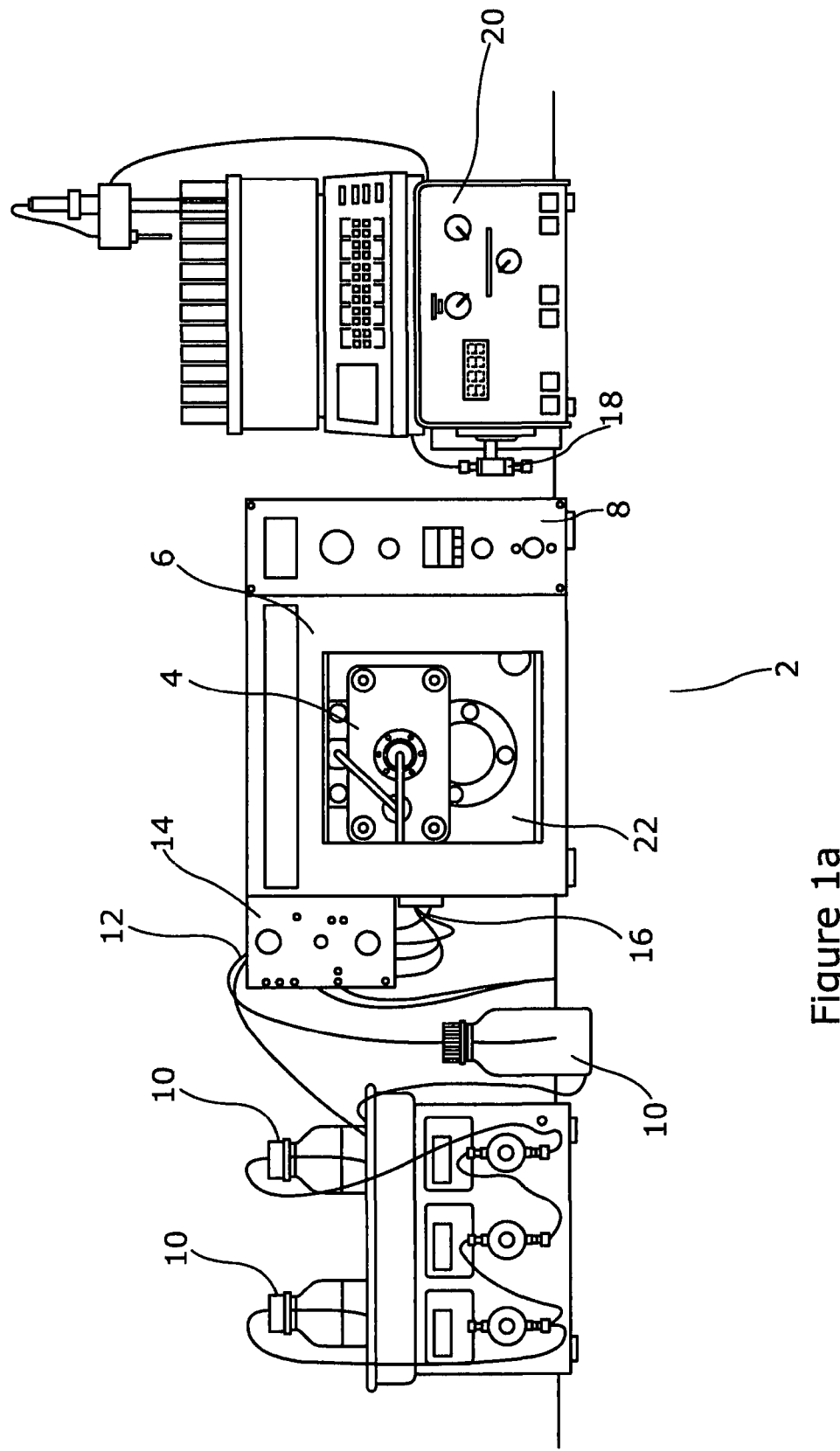

| | | | |
|---|---|---|---|
| 5,449,022 A * | 9/1995 | Witthaus | B32B 27/34 138/137 |
| 2014/0249013 A1* | 9/2014 | Wood | B04B 5/02 494/15 |

* cited by examiner

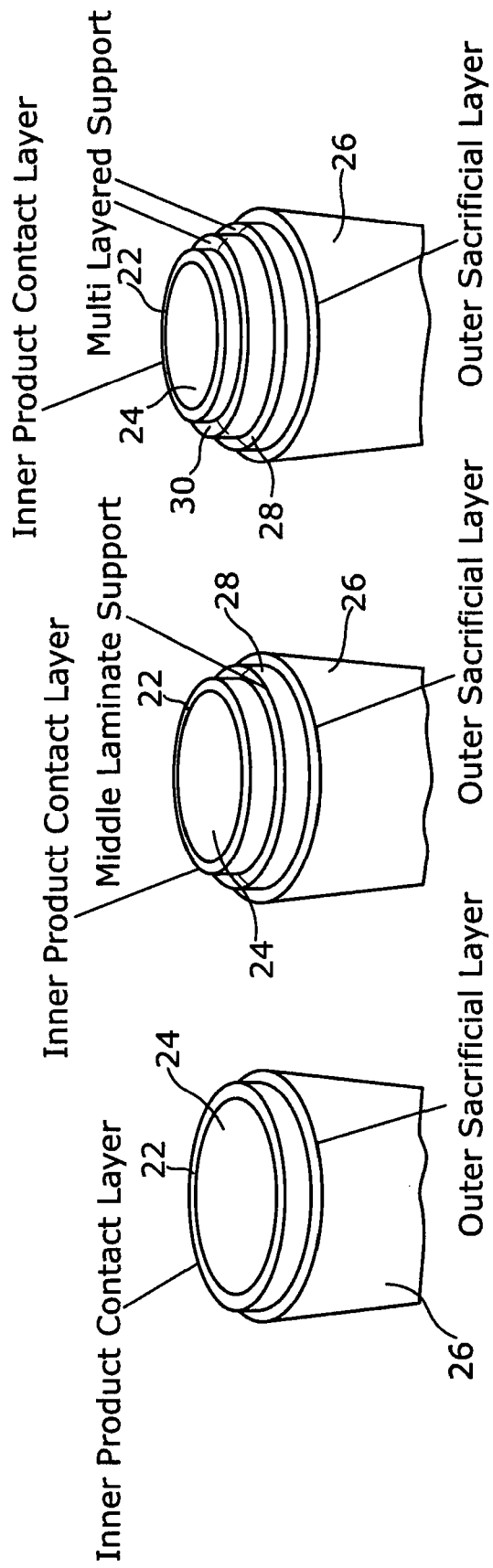

CENTRIFUGE APPARATUS WITH LAYERED FLYING LEADS

CROSS-REFERENCE TO RELATED APPLICATIONS

This United States application is the National Phase of PCT Application No. PCT/GB2018/053303 filed 14 Nov. 2018, which claims priority to British Patent Application No. 1718968.9 filed 16 Nov. 2017, each of which is incorporated herein by reference.

The invention to which this application relates is to an improvement in centrifuge apparatus and, in particular, improvements to the leads or tubes, commonly referred to as "flying leads" which are mounted with respect to a body to be rotated at relatively high speeds in order to allow the separation of components of liquid which is supplied to and passes through the flying leads as the same are rotated. The separated components are then collected and utilised as required.

One known use is for counter current chromatography (CCC) which is a technique in which substances are caused to partition between two liquid phases in a column in the form of a helix or spiral and one phase is a static phase and the other is a mobile phase. The static phase is kept static using centripetal acceleration by rotating the column about a first axis while the column is itself rotated orbitally about a second axis radially distanced from the centre of the column, i.e. in a "planetary" rotation. Whilst in this planetary motion the mobile phase is caused to flow along the column in contact with the static phase. This two-component rotational motion causes rapidly fluctuating centrifugal forces in the column, resulting in alternating mixing and de-mixing of the static and mobile phases, and consequent separation of the substance between the static and mobile phases so that substances in the mobile phase become located at distinct positions in the flow of the mobile phase.

It is necessary to provide liquid flow communication between the rotating columns and stationary liquid input and output means. This communication is normally provided by tubular input and outlet conduits referred to in the art as "flying leads".

Typically each flying lead is threaded through the centrifuge body and by arranging the flying leads in this way, the respective winding effects of rotation of the flying leads about the first and second rotation axes cancel each other out and the flying leads do not become tangled.

It is known that while the steps which are conventionally taken to reduce the risk of tangling and rubbing occurring and also additional steps to add grease or other lubricants to the housing, do increase the lifetime of the flying leads to an extent, the flying leads still tend to be the component of the apparatus which requires replacement with greatest frequency and as such represent the greatest reason for downtime of the use of the apparatus, as the flying leads are removed and replaced with new ones. Also, the replacement of the flying lead can be problematic and time consuming due to the need to thread the same through the passages in the centrifuge body. The flying leads can also act as a limitation to the capacity of the apparatus as, while it is possible to increase the size of the flying leads and hence throughput of liquid, the increase in size tends to have a detrimental effect on the stiffness of the flying leads and reduces the lifetime of the same even if further steps of lubrication are provided.

The apparatus is typically used in the targeting, separation and removal of one or more specified components of a material such as a biomass material which can include, for example, plant biomass such as cannabis, brassicas, microalgae and fermented compounds and/or liquids such as polluted water. The components which are extracted can be selected from a wide range and examples of components are peptides, polypeptides, DNA, insecticides, pollutants from water. As such the apparatus allows the extraction of the components in one or a short number of steps and thereby allow the extracted components to then be available for subsequent processing and use as required.

An aim of the present invention is therefore to provide flying leads for use in centrifuge apparatus in a form which allows the lifetime of the flying leads to be increased and preferably the size of the same to be scalable.

In a first aspect of the invention, there is provided a centrifuge apparatus including an inlet for the supply of one or more liquids provided to pass through the apparatus, at least one pump to allow the fluid to be pumped into and through a plurality of flying lead assemblies, a rotatable centrifuge body through which the said flying lead assemblies pass and from which one or more separated components of the said liquid are collected via outlets of the said flying lead assemblies, and wherein at least one of the said flying lead assemblies includes an inner layer which defines a passage for liquid to flow therealong and at least one further layer which acts as the outer layer of the flying lead assembly.

In one embodiment the outer layer is formed of a material in order to allow the same to act as a sacrificial layer during use of the apparatus and thereby prevent damage to the walls of the core passage along which the liquid passes during operation of the apparatus.

In one embodiment the outer layer is formed as an integral part of the flying lead.

In one embodiment the outer layer is laminated to the external surface of the wall of the core passage of the flying lead.

In one embodiment the outer layer extends between the opposing ends of the core passage.

In one embodiment the flying lead assembly includes at least one intermediate layer. Typically the at least one intermediate layer is formed so as to act as a support layer of the flying lead assembly.

In one embodiment a plurality of said flying lead assemblies are provided.

In one embodiment one or more flying lead assemblies are accommodated within and along a guide channel. In one embodiment a lubricant material is provided in the space between the flying lead assemblies and the inner surface of the guide channel.

In a further aspect of the invention there is provided a flying lead assembly, said assembly including a passage defined by an inner layer and along which a liquid can pass between opposing ends of the passage and wherein the assembly includes an outer layer which extends at least partially between the said ends and forms the external surface of the flying lead assembly.

In one embodiment the said outer layer is laminated to the external surface of the wall of the core passage or intermediate layer at at least the opposing ends of the core passage.

In one embodiment the outer layer is formed of PTFE material.

In one embodiment there is provided one or more intermediate layers which, in one embodiment act to support the flying lead assembly in the required form for use.

In one embodiment the assembly includes lubricant material trapped within a cavity between a guide channel and the outer surface of the one or more flying lead assemblies located therein and the seals between the same at the opposing ends of the flying lead assembly.

In one embodiment the flying leads are provided in this form as part of a cassette and the cassette can be selectively removed when the lifespan of the flying leads has reached a predetermined end or a flying lead has failed, and be replaced with a new cassette without the need to thread individual flying leads through the centrifuge body.

Specific embodiments of the invention are now described; wherein

Figure 1B:
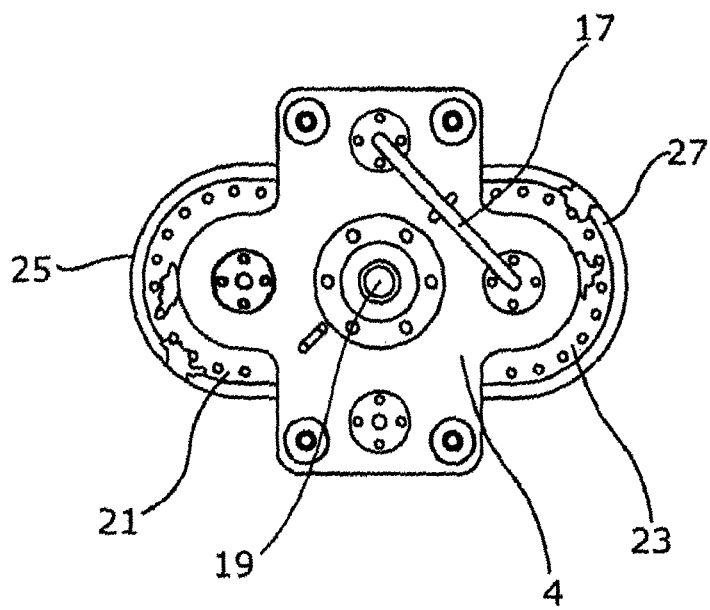
Figure 1C:
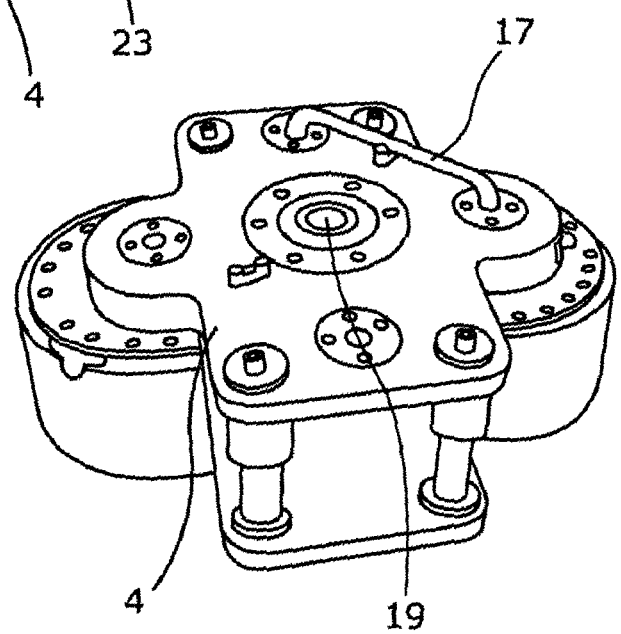
Figure 1D:
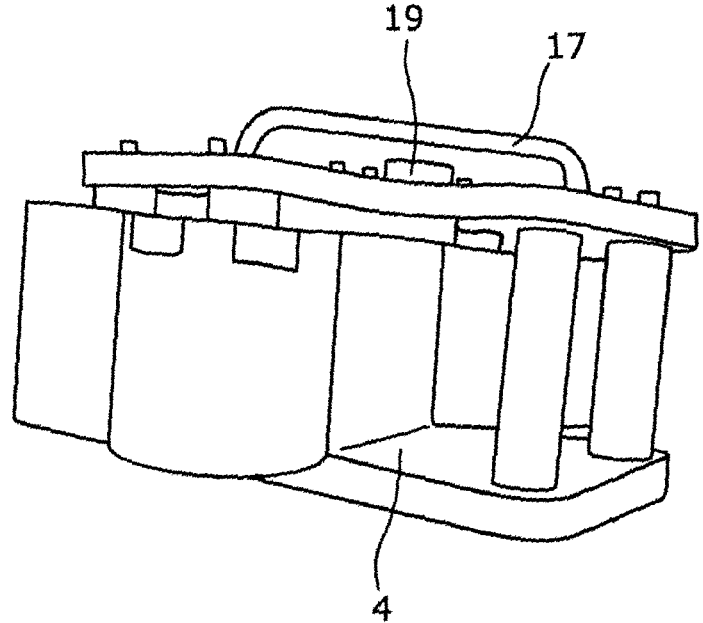
Figure 3:
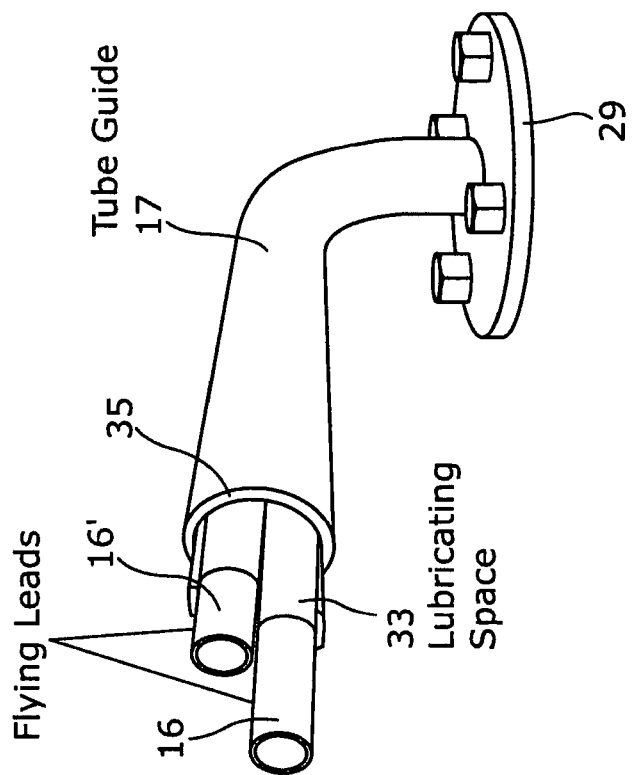
Figure 2:
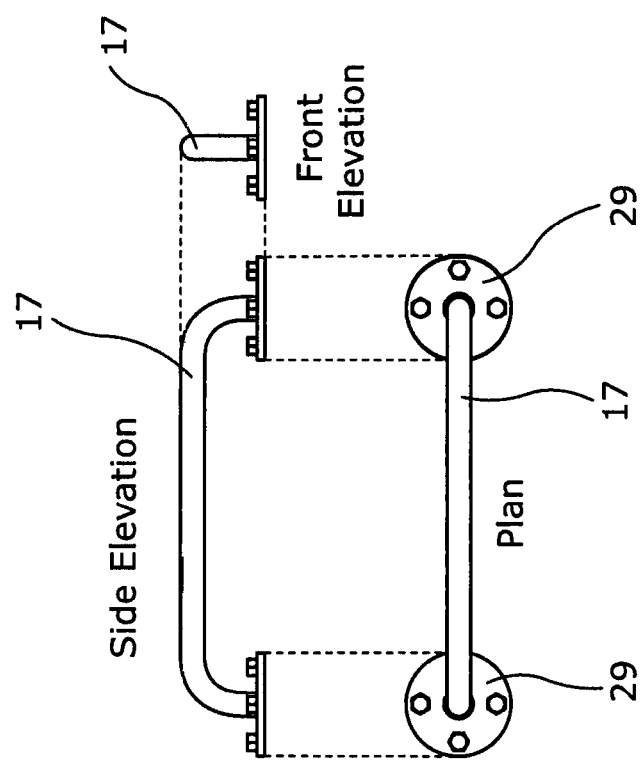

FIGS. 1a-d illustrate centrifuge apparatus in a format with which the flying lead assemblies in accordance with the invention can be used; and FIG. 2 illustrates views of the guide channels for flying lead assemblies in accordance with one embodiment of the invention;

FIG. 3 illustrates part of the guide channel with flying lead assemblies located therein in accordance with one embodiment of the invention; and FIGS. 4a-c illustrates embodiments of flying lead assemblies in accordance with the invention.

Referring firstly to FIG. 1a there is illustrated centrifuge apparatus 2 in one format. The apparatus 2 includes a centrifuge body 4, an example of which is shown in FIGS. 1b-d and which is intended to be rotated at high speeds, for example in excess of 2000 rpm. The centrifuge body 4 is located in a housing 6 for protection and control of environmental conditions such as temperature. A control system 8 is provided in the housing along with a motor (not shown) to allow controlled rotation of the body 4. Liquid reservoirs 10 are connected to an inlet 12 to allow the required liquid to enter into the centrifuge body via pump unit 14 and flying leads 16 which are located in guide channels 17 and an outlet 18 allow the separated liquid components to leave the centrifuge body 4 and be collected at collection apparatus 20 and stored for subsequent use.

The centrifuge body 4 is mounted on a support wall of the housing and has a shaft 19 which is driven by a motor via a drive belt The flying lead assemblies 16 pass through the centrifuge body 4 and into planetary parts 21, 23 which are themselves rotatable about respective axes 25, 27 and are rotated with respect to the shaft 19 so as to allow the separation of the liquid into liquid components within the flying lead assemblies.

Turning now to the guide channels 17 for the flying lead assemblies 16 in accordance with the invention, these are shown in more detail in FIG. 2 and typically are formed of relatively rigid material such as stainless steel but could also be made of, for example, a relatively rigid polymer, and are secured to the body 4 via flanges 29 and securing bolts.

With reference now to FIG. 3, the interior 31 of the guide channel 17 is shown in accordance with one embodiment of the invention. It will be seen that within and along the guide channel interior 31 there are provided, in this embodiment, two flying lead assemblies 16, 16' and in the cavity 33 between the outer walls of the flying lead assemblies and the inner surface 35 of the guide channel there is provided a lubricant material, such as grease.

The flying lead assemblies are free to move about inside the guide channel 17 but their movement is constrained at the opposing ends of the guide channel. In order to reduce the effect of wear on the flying lead assemblies which can be caused by the primary contact with the inner surface 35 of the guide channel, the inner surface 35 is typically coated with a polymer such as PTFE.

The interior passage 31 extends along the length of the guide channel and along which the flying lead assemblies 16, 16', and the liquid therein, passes.

FIGS. 4a-c illustrate cross sectional elevations of a number of embodiments of a flying lead assembly 16 in accordance with the invention. In FIG. 4a, the flying lead assembly comprises a core inner layer 22 which defines the passage 24 along which the liquid passes. In FIG. 4a there is also provided an outer layer 26 of a relatively hard wearing material, such as PTFE, and, in use this acts as a sacrificial layer inasmuch that it will wear over time but, as this layer forms the outer surface of the flying lead assembly and is therefore the surface which is in contact with the causes of the wear, such as other flying lead assemblies and/or the guide channel, the wear of this outer layer prevents the wear of the inner core layer 22 and hence protects the material of the inner layer 22 from being worn during use. This, in turn, maintains the integrity of the core passage 24 and prevents leakage of liquid from the same and so enhances and increases the lifetime of the flying lead assembly in comparison to the conventional single layer flying lead.

In FIGS. 4b and 4c the inner core layer 22 is again provided, as is the outer layer 26, but, in FIG. 4b, an intermediate layer 28 is provided.

In FIG. 4c a further intermediate layer 30 is provided.

In one embodiment the said outer layer 26 and, when provided intermediate layers 28, 30 can be provided separately to the inner layer and/or each other. Alternatively the one or more layers may be joined together, perhaps by lamination, at least partially along their length, and typically at least at the opposing ends, so that the said layers are integrally connected in use.

In both embodiments the intermediate layers 28, 30 are preferably formed of a material which has greater rigidity and/or strength than at least one of the inner layer 22 and/or outer layer 26 in order to provide increased structural support and/or rigidity for the flying lead assembly. Typically the use of one or both intermediate layers 28, 30 and/or the materials used to form the same is selected with reference to the particular size requirements and/or particular forms of the centrifuge apparatus in which the flying lead assemblies are to be used.

Typically both of the flying lead 16.16' are formed with an inner layer 22 and outer layer 26 and most typically the same form of flying leads assemblies are used along the same guide channel.

In one embodiment each flying lead assembly 16, 16' can be provided as a replaceable cassette alone, or alternatively the flying guide assemblies 16, 16' can be provided as a combined cassette to be replaced together or alternatively the flying lead assemblies 16, 16' and guide channel 17 can be provided as a combine cassette, so as to allow the same to removed and replaced.

In each option, the cassette can be replaced at fixed time intervals and thereby avoids the need as is conventionally the case of having to thread individual flying leads through the apparatus when there is a failure or leakage of a flying lead. This thereby allowing the regular maintenance of the flying lead assemblies to be achieved on site and by non-skilled personnel.

As such this invention allows greater flexibility in use of the flying lead assembly and the design of the same in terms of different column configurations and connectivity to suit particular usage and environments.

The invention claimed is:

1. A centrifuge apparatus, said apparatus comprising: an inlet for the supply of one or more liquids provided to pass through the apparatus, at least one pump to allow the fluid to be pumped into and through a plurality of flying lead assemblies, a rotatable centrifuge body through which the plurality of flying lead assemblies pass and from which one or more separated components of the said liquid are collected via outlets of the plurality of flying lead assemblies, and at least one of the plurality of flying lead assemblies includes an inner layer which defines a passage for liquid to flow therealong, an outer layer, and at least one further layer which is located intermediate said inner and outer layers, wherein the layers are joined together by lamination and the outer layer acts as a first wear layer of the at least one of the plurality of flying lead assemblies during use of the apparatus and the at least one further layer has a greater rigidity and strength than the outer layer.

2. Apparatus according to claim 1 wherein the said outer layer extends between opposing ends of the said passage.

3. Apparatus according to claim 1 wherein the plurality of flying lead assemblies are provided and accommodated within and along a guide channel.

4. Apparatus according to claim 1 wherein a lubricant material is provided in a cavity formed between the outer layer of the at least one of the plurality of flying lead assemblies located in a guide channel and an inner surface of a wall of the said guide channel.

5. Apparatus according to claim 4 wherein the lubricant material is trapped within the cavity by seals provided at opposing ends of the guide channel.

6. A flying lead assembly, said assembly including a passage defined by an inner layer and along which a liquid can pass between opposing ends of the passage and the assembly includes an outer layer which extends at least partially between the said opposing ends and forms an external surface of the flying lead assembly and a further layer located intermediate the inner and outer layers and wherein the layers are joined by lamination, the outer layer acts as a first wear layer of the said flying lead assembly and the further layer has greater strength and rigidity than the outer layer.

7. The flying lead assembly according to claim 6 wherein said outer layer is laminated to the external surface of the further layer at or adjacent to the opposing ends of the passage.

8. The flying lead assembly according to claim 6 wherein the outer layer is formed of a polymer material.

9. The flying lead assembly according to claim 6 wherein a plurality of the flying lead assembly are located along a guide channel.

10. The flying lead assembly according to claim 6 wherein the flying lead assembly and/or guide channel are provided as part of a cassette which is selectively removable from an apparatus to allow the same to be replaced or repaired.

* * * * *